United States Patent
Choi et al.

(10) Patent No.: US 12,301,867 B2
(45) Date of Patent: *May 13, 2025

(54) INTRA PREDICTION DEVICE AND METHOD INVOLVING MATRIX-BASED INTRA PREDICTION

(71) Applicant: LG Electronics Inc., Seoul (KR)

(72) Inventors: Jangwon Choi, Seoul (KR); Seunghwan Kim, Seoul (KR); Jin Heo, Seoul (KR); Jungah Choi, Seoul (KR); Sunmi Yoo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/220,646

(22) Filed: Jul. 11, 2023

(65) Prior Publication Data

US 2023/0362406 A1 Nov. 9, 2023

Related U.S. Application Data

(63) Continuation of application No. 17/677,602, filed on Feb. 22, 2022, now Pat. No. 11,743,496, which is a
(Continued)

(51) Int. Cl.
 *H04N 19/593* (2014.01)
 *H04N 19/105* (2014.01)
(Continued)

(52) U.S. Cl.
 CPC ......... *H04N 19/593* (2014.11); *H04N 19/105* (2014.11); *H04N 19/132* (2014.11);
(Continued)

(58) Field of Classification Search
 CPC .. H04N 19/593; H04N 19/105; H04N 19/132; H04N 19/159; H04N 19/176;
(Continued)

(56) References Cited

U.S. PATENT DOCUMENTS

2018/0288409 A1 10/2018 Heo et al.
2020/0322620 A1* 10/2020 Zhao .................. H04N 19/186
(Continued)

FOREIGN PATENT DOCUMENTS

WO  WO 2016/040865 A1  3/2016
WO  WO 2017/209328 A1  12/2017

OTHER PUBLICATIONS

Bross et al., "Versatile Video Coding (Draft 5)," JVET-N1001-v10, Joint Video Experts Team (JVET) of ITU-T SG 16 WP 3 and ISO/IEC JTC 1/SC 29/WG 11, Meeting #14, Geneva, CH, Mar. 19-27, 2019, 6 pages.
(Continued)

*Primary Examiner* — Francis Geroleo
(74) *Attorney, Agent, or Firm* — Fish & Richardson P.C.

(57) ABSTRACT

An image decoding method includes obtaining image information including residual information and prediction-related information through a bitstream, deriving transform coefficients based on the residual information, generating residual samples for a current block based on the transform coefficients, deriving an intra prediction mode for the current block based on the prediction-related information, generating prediction samples for the current block based on the intra prediction mode, generating reconstructed samples for the current block based on the prediction samples and the residual samples, wherein the image information includes flag information related to whether an intra prediction mode type for the current block is a matrix-based intra prediction (MIP), wherein the intra prediction mode type for the current block is determined as the MIP based on the flag information, and wherein the prediction samples for the current block are generated based on MIP samples.

3 Claims, 15 Drawing Sheets

Related U.S. Application Data continuation of application No. PCT/KR2020/011239, filed on Aug. 24, 2020.

(60) Provisional application No. 62/890,584, filed on Aug. 22, 2019.

(51) Int. Cl.
| | | |
|---|---|---|
| *H04N 19/132* | (2014.01) | |
| *H04N 19/159* | (2014.01) | |
| *H04N 19/176* | (2014.01) | |
| *H04N 19/18* | (2014.01) | |
| *H04N 19/59* | (2014.01) | |
| *H04N 19/70* | (2014.01) | |

(52) U.S. Cl.
CPC ......... *H04N 19/159* (2014.11); *H04N 19/176* (2014.11); *H04N 19/18* (2014.11); *H04N 19/59* (2014.11); *H04N 19/70* (2014.11)

(58) Field of Classification Search
CPC ........ H04N 19/18; H04N 19/59; H04N 19/70; H04N 19/11; H04N 19/122
See application file for complete search history.

(56) References Cited

U.S. PATENT DOCUMENTS

| | | | |
|---|---|---|---|
| 2020/0404324 A1* | 12/2020 | Pham Van | H04N 19/593 |
| 2020/0404325 A1* | 12/2020 | Ramasubramonian | H04N 19/44 |
| 2021/0314562 A1* | 10/2021 | Kang | H04N 19/176 |
| 2021/0385438 A1* | 12/2021 | Deng | H04N 19/18 |

OTHER PUBLICATIONS

Office Action in Chinese Appln. No. 202080072351.7, mailed on Mar. 29, 2024, 17 pages (with English translation).
Office Action in Chinese Appln. No. 202080072351.7, mailed on Aug. 8, 2024, 7 pages (with English translation).

* cited by examiner

INTRA PREDICTION DEVICE AND METHOD INVOLVING MATRIX-BASED INTRA PREDICTION

CROSS-REFERENCE TO RELATED APPLICATIONS

This application is a continuation of U.S. application Ser. No. 17/677,602, filed on Feb. 22, 2022, which is a continuation pursuant to 35 U.S.C. § 119(e) of International Application number PCT/KR2020/011239, filed Aug. 24, 2020, which claims the benefit of U.S. Provisional Application No. 62/890,584, filed on Aug. 22, 2019, the contents of which are hereby incorporated by reference herein in their entirety.

BACKGROUND OF THE DISCLOSURE

Field of the Disclosure

The present document is related to an intra prediction device and method.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

Further, in order to improve compression efficiency and to enhance subjective/objective visual quality, there is a discussion about a scheme for enhancing data transmission efficiency in a matrix-based intra prediction (MIP) process.

SUMMARY

According to an embodiment of the present document, a method and an apparatus for enhancing image/video coding efficiency are provided.

According to an embodiment of the present document, efficient intra prediction method and device are provided.

According to an embodiment of the present document, efficient MIP application method and device are provided.

According to an embodiment of the present document, whether to apply MIP can be adaptively selected in accordance with a type of a current block.

According to an embodiment of the present document, an MIP process can be performed without limiting a condition related to a type of a current block.

According to an embodiment of the present document, the number of MIP modes can be adaptively selected in accordance with a type of a current block.

According to an embodiment of the present document, an MIP process may not be performed for a block of which MIP prediction efficiency is relatively low.

According to an embodiment of the present document, a smaller number of MIP modes can be used for a block of which MIP prediction efficiency is relatively low.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing a decoding apparatus to perform the video/image decoding method disclosed in at least one of the embodiments of the present document, is stored.

According to an embodiment of the present document, the overall image/video compression efficiency can be enhanced.

According to an embodiment of the present document, the subjective/objective visual quality can be enhanced through efficient intra prediction.

According to an embodiment of the present document, an MIP process for image/video coding can be efficiently performed.

According to an embodiment of the present document, the MIP process may not be performed for the block of which the MIP prediction efficiency is relatively low, and thus the MIP prediction efficiency can be enhanced.

According to an embodiment of the present document, since a smaller number of MIP modes are used for the block of which the MIP prediction efficiency is relatively low, an amount of transmission data for the MIP modes can be reduced, and the MIP prediction efficiency can be enhanced.

According to an embodiment of the present document, since the MIP process is performed without limiting the condition related to the type of the current block, signaling can be simplified, and there is an advantage on hardware implementation.

DESCRIPTION OF EXEMPLARY EMBODIMENTS

Figure 1:
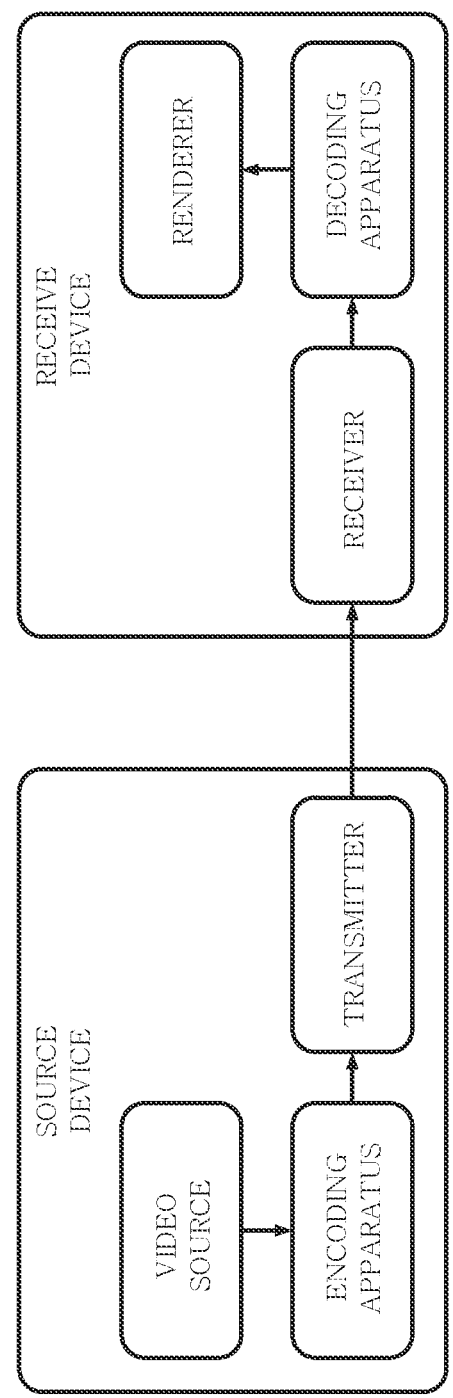
FIG. 1 schematically illustrates an example of a video/image coding system that can be applied to embodiments of the present document.

The present document may be modified in various forms, and specific embodiments thereof are described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the disclosure of the present document.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Hereinafter, examples of the present embodiment are described in detail with reference to the accompanying drawings. In addition, like reference numerals are used to indicate like elements throughout the drawings, and the same descriptions on the like elements are omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of processes such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of processes such as dequantization, inverse transform, and prediction corresponding to the operation of the encoding apparatus.

The renderer may render the decoded video/image. The rendered video/image may be displayed through the display.

Figure 2:
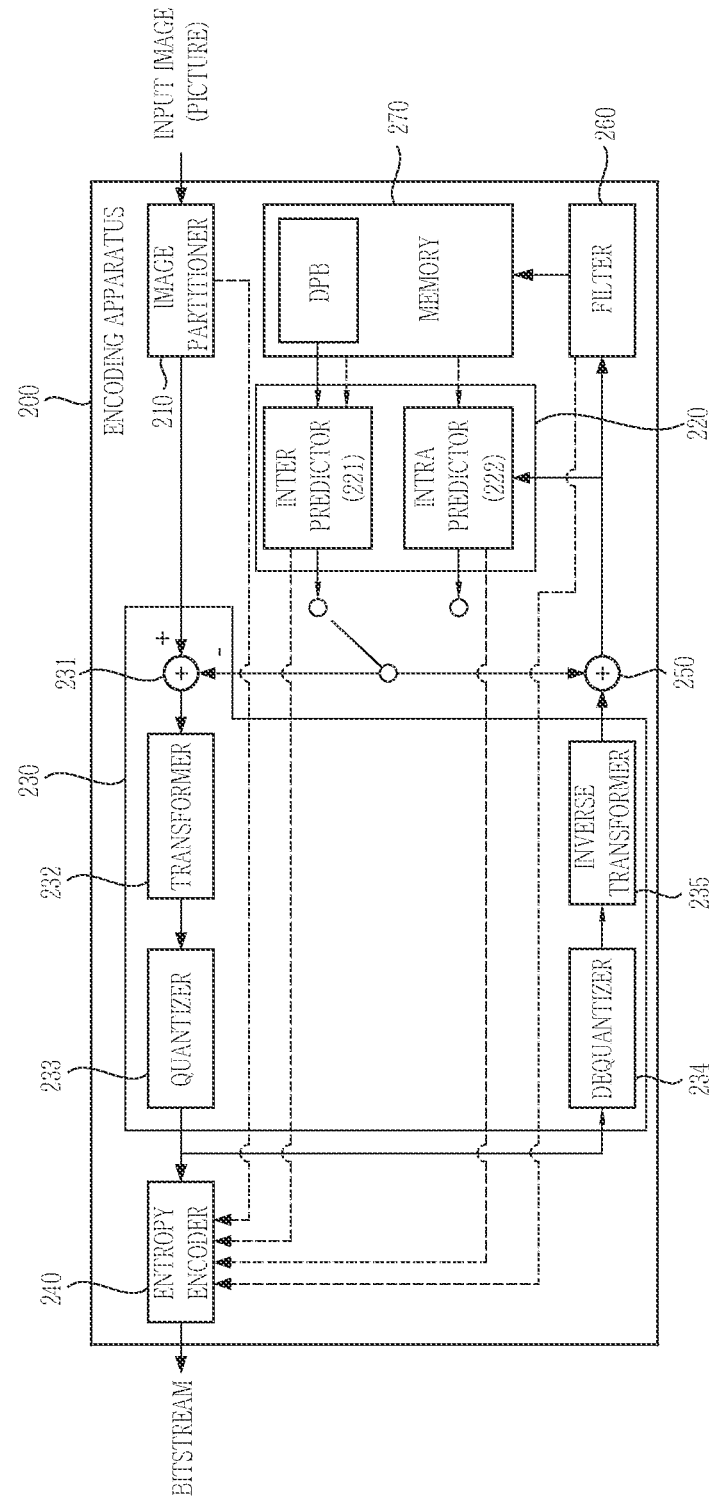
FIG. 2 is a diagram schematically explaining the configuration of a video/image encoding apparatus that can be applied to embodiments of the present document.

FIG. 2 is a diagram schematically illustrating a configuration of a video/image encoding apparatus to which the embodiments of the present document may be applied. Hereinafter, what is referred to as the video encoding apparatus may include an image encoding apparatus. Also, the image encoding method/apparatus may include a video encoding method/apparatus. Alternatively, the video encoding method/apparatus may include an image encoding method/apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding process according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding process may include a process of prediction, transform, and reconstruction, which are described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
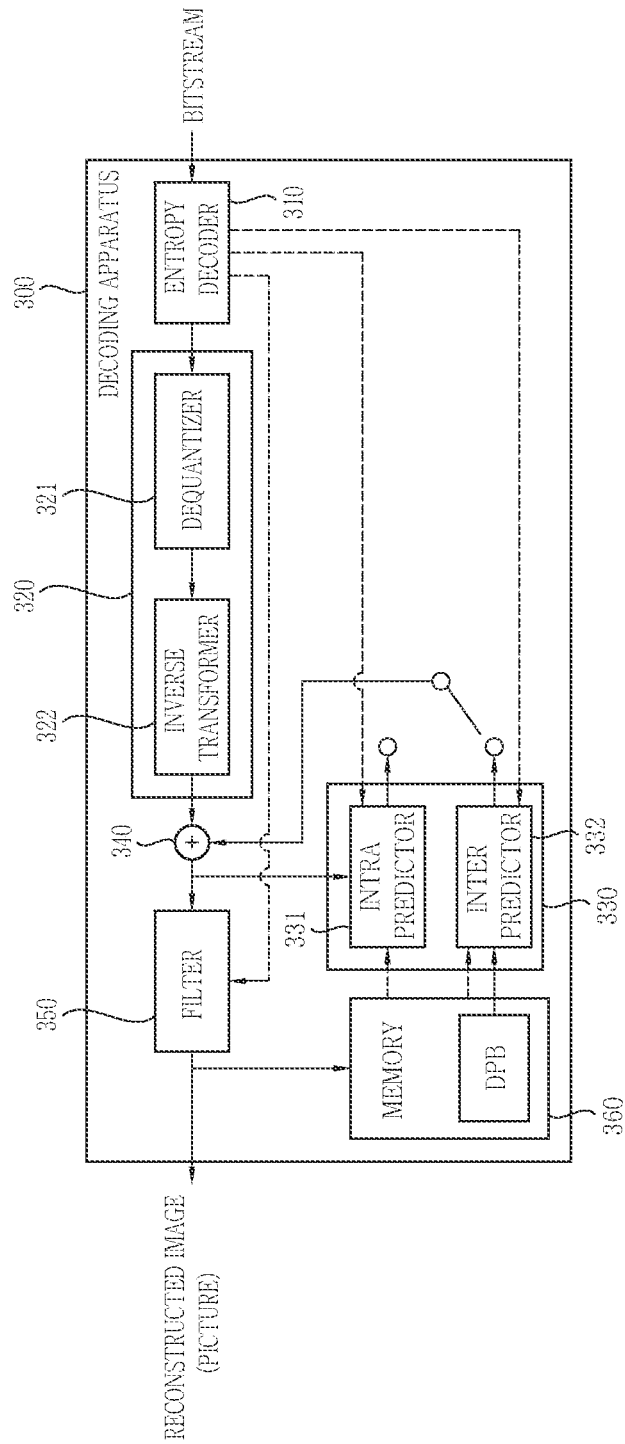
FIG. 3 is a diagram schematically explaining the configuration of a video/image decoding apparatus that can be applied to embodiments of the present document.

FIG. 3 is a schematic diagram illustrating a configuration of a video/image decoding apparatus to which the embodiment(s) of the present disclosure may be applied. Also, the image decoding method/apparatus may include a video decoding method/apparatus. Alternatively, the video decoding method/apparatus may include an image decoding method/apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

The predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Meanwhile, in case that intra prediction is performed, correlation between samples may be used, and a difference between the original block and a predicted block, that is, residual, may be obtained. The above-described transform and quantization may be applied to the residual, and through this, spatial redundancy may be removed. Hereinafter, an encoding method and a decoding method, in which intra prediction is used, will be described in detail.

The intra prediction means a prediction generating prediction samples for a current block based on reference samples outside the current block in a picture (hereinafter, current picture) including the current block. Here, the reference samples outside the current block may be called samples positioned around the current block. In case that the intra prediction is applied to the current block, neighboring reference samples to be used for the intra prediction of the current block may be derived.

For example, in case that the size (width×height) of the current block is nW×nH, the neighboring reference samples of the current block may include a sample adjacent to a left boundary of the current block and total 2×nH bottom-left neighboring samples, a sample adjacent to a top boundary of the current block and total 2×nW top-right neighboring samples, and one top-left neighboring sample of the current block. Further, the neighboring reference samples of the current block may include a plurality of columns of top neighboring samples and a plurality of rows of left neighboring samples. Further, the neighboring reference samples of the current block may include total nH samples adjacent to a right boundary of the current block having the size of nW×nH, total nW samples adjacent to a bottom boundary of the current block, and one bottom-right neighboring sample of the current block.

However, some of the neighboring reference samples of the current block may not yet been decoded, or may not yet been available. In this case, the decoding apparatus may configure the neighboring reference samples to be used for prediction by substituting available samples for the unavailable samples. Further, the decoding apparatus may configure the neighboring reference samples to be used for the prediction through interpolation of the available samples.

In case that the neighboring reference samples are derived, (i) a prediction sample may be induced based on an average or interpolation of the neighboring reference samples of the current block, or (ii) the prediction sample may be induced based on the reference sample that is present in a specific (prediction) direction with respect to the prediction sample among the neighboring reference samples of the current block. The case of (i) may be applied in case that the intra prediction mode is a non-directional mode or a non-angular mode, and the case of (ii) may be applied in case that the intra prediction mode is a directional mode or an angular mode.

Further, the prediction sample may be generated through interpolation between the first neighboring sample positioned in a prediction direction of the intra prediction mode of the current block and the second neighboring sample positioned in an opposite direction to the prediction direction based on the prediction sample of the current block among the neighboring reference samples. The above-described case may be called a linear interpolation intra prediction (LIP). Further, chroma prediction samples may be generated based on luma samples using a linear model. This case may be called an LM mode.

Further, the prediction sample of the current block may be derived by deriving a temporary prediction sample of the current block based on the filtered neighboring reference samples and performing weighted sum of the temporary prediction sample and at least one reference sample derived in accordance with the intra prediction mode among the existing neighboring reference samples, that is, the non-filtered neighboring reference samples. The above-described case may be called a position dependent intra prediction (PDPC).

Further, the intra prediction coding may be performed in a method for deriving a prediction sample using a reference sample positioned in the prediction direction in a reference sample line having the highest prediction accuracy through selection of the corresponding line among neighboring multi-reference sample lines of the current block, and for indicating (signaling) the reference sample line used at that time to the decoding apparatus. The above-described case may be called a multi-reference line (MRL) intra prediction or MRL-based intra prediction.

Further, in performing the intra prediction based on the same intra prediction modes through division of the current block into vertical or horizontal sub-partitions, the neighboring reference samples may be derived and used in the unit of the sub-partition. That is, the intra prediction mode for the current block may be equally applied to the sub-partitions, and in this case, since the neighboring reference samples are derived and used in the unit of the sub-partition, the intra prediction performance can be enhanced in some cases. This prediction method may be called an intra sub-partitions (ISP) or ISP-based intra prediction.

The above-described intra prediction methods may be called an intra prediction type in distinction from the intra prediction mode. The intra prediction type may be called various terms, such as an intra prediction technique or an additional intra prediction mode. For example, the intra prediction type (or additional intra prediction mode) may include at least one of LIP, PDPC, MRL, and ISP as described above. A general intra prediction method excluding the specific intra prediction type, such as the LIP, PDPC, MRL, or ISP, may be called a normal intra prediction type. In case that the above-described specific intra prediction type is not applied, the normal intra prediction type may be generally applied, and the prediction may be performed based on the above-described intra prediction mode. Meanwhile, as needed, a post-filtering for the derived prediction sample may be performed.

Meanwhile, in addition to the above-described intra prediction types, a matrix-based intra prediction (hereinafter, MIP) may be used as one method for the intra prediction. The MIP may be called an affine linear weighted intra prediction (ALWIP) or a matrix weighted intra prediction (NWIP).

In case that the MIP is applied to the current block, i) using the neighboring reference samples of which an averaging process has been performed, ii) a matrix-vector-multiplication process may be performed, and iii) as needed, prediction samples for the current block may be derived by further performing a horizontal/vertical interpolation process. The intra prediction modes used for the MIP may be the above-described LIP, PDPC, MRL, or ISP intra prediction, but may be configured differently from the intra prediction modes used in the normal intra prediction.

The intra prediction mode for the MIP may be called an "affine linear weighted intra prediction mode" or matrix-based intra prediction mode. For example, in accordance with the intra prediction mode for the MIP, a matrix and an offset being used in the matrix vector multiplication may be differently configured. Here, the matrix may be called an (affine) weight matrix, and the offset may be called an (affine) offset vector or an (affine) bias vector. In the present document, the intra prediction mode for the MIP may be called an MIP intra prediction mode, a linear weighted intra prediction mode, a matrix weighted intra prediction mode, or a matrix-based intra prediction mode. A detailed MIP method will be described later.

The following drawings have been prepared to explain a detailed example of the present document. Since the name of a detailed device described in the drawing, a detailed term or name (e.g., name of a syntax) is exemplarily presented, the technical features of the present document are not limited to the detailed name used in the following drawings.

Figure 4:
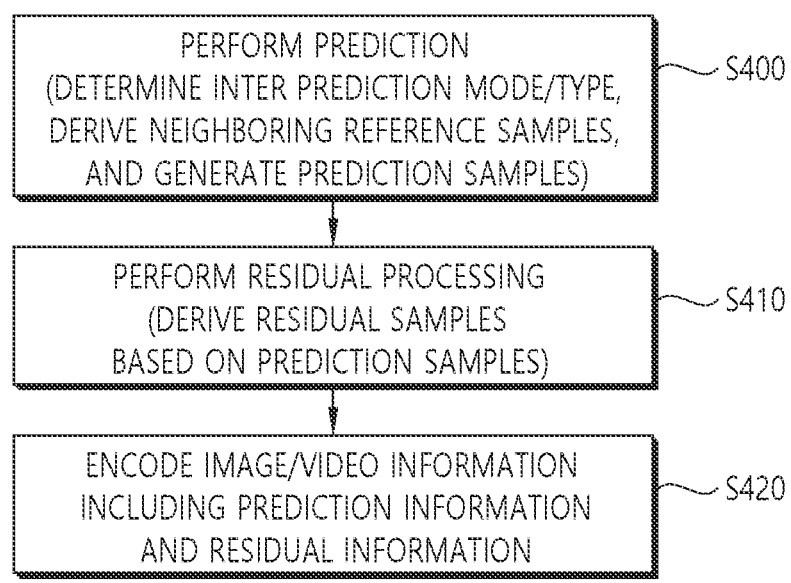
FIG. 4 schematically illustrates an example of an image encoding method based on intra prediction to which embodiments of the present document are applicable.

FIG. 4 schematically illustrates an example of an image encoding method based on intra prediction to which embodiments of the present document are applicable.

Referring to FIG. 4, S400 may be performed by the intra predictor 222 of the encoding apparatus, and S410 may be performed by the residual processor 230 of the encoding apparatus. Specifically, S410 may be performed by the subtractor 231 of the encoding apparatus. In S420, prediction information may be derived by the intra predictor 222, and encoded by the entropy encoder 240. In S420, residual information may be derived by the residual processor 230, and encoded by the entropy encoder 240. The residual information indicates information on the residual samples. The residual information may include information on quantized transform coefficients for the residual samples. As described above, the residual samples may be derived by transform coefficients through the transformer of the encoding apparatus, and the transform coefficients may be derived by quantized transform coefficients through the quantizer. The information on the quantized transform coefficients may be encoded by the entropy encoder 240 through a residual coding process.

The encoding apparatus performs the intra prediction for the current block (S400). The encoding apparatus may derive the intra prediction mode/type for the current block, derive the neighboring reference samples of the current block, and generate the prediction samples in the current block based on the intra prediction mode/type and the neighboring reference samples. Here, processes of determining the intra prediction mode/type, deriving the neighboring reference samples, and generating the prediction samples may also be simultaneously performed, and any one process may also be performed earlier than other processes.

The encoding apparatus may also perform the prediction sample filtering process. The prediction sample filtering may be called a post filtering. Some or all of the prediction samples may be filtered by the prediction sample filtering process. The prediction sample filtering process may be omitted in some cases.

The encoding apparatus generates residual samples for the current block based on (filtered) prediction samples (S410). The encoding apparatus may derive residual samples through comparison of the prediction samples with the original samples of the current block based on phases.

The encoding apparatus may encode image information including information on intra prediction (prediction information) and residual information on residual samples (S420). The prediction information may include intra prediction mode information and intra prediction type information. The residual information may include a residual coding syntax. The encoding apparatus may derive quantized transform coefficients by performing transform/quantization of the residual samples. The residual information may include information on the quantized transform coefficients.

The encoding apparatus may output the encoded image information in the form of a bitstream. The output bitstream may be transferred to the decoding apparatus through a storage medium or a network.

As described above, the encoding apparatus may generate a reconstructed picture (including reconstructed samples and a reconstructed block). For this, the encoding apparatus may derive (modified) residual samples by performing dequantization/inverse transform of the quantized transform coefficients again. The reason why the residual samples are dequantized/inverse transformed again after being transformed/quantized is to derive the same residual samples as the residual samples derived by the decoding apparatus as described above. The encoding apparatus may generate the reconstructed block including the reconstructed samples for the current block based on the prediction samples and the (modified) residual samples. Based on the reconstructed block, the reconstructed picture for the current picture may be generated. As described above, an in-loop filtering process may be further applied to the reconstructed picture.

Figure 5:
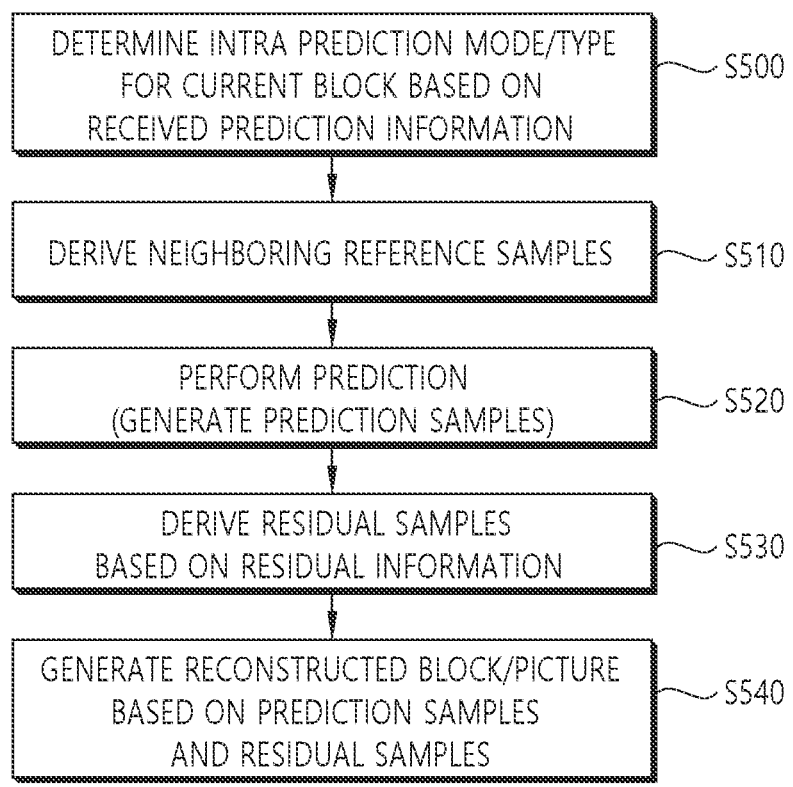
FIG. 5 schematically illustrates an example of an image decoding method based on intra prediction to which embodiments of the present document are applicable.

FIG. 5 schematically illustrates an example of an image decoding method based on intra prediction to which embodiments of the present document are applicable.

Referring to FIG. 5, the decoding apparatus may perform an operation corresponding to the aforementioned operation performed by the encoding apparatus. S500 to S520 may be performed by the intra predictor 331 of the decoding apparatus, and the prediction information in S500 and the residual information in S530 may be obtained from the bitstream by the entropy decoder 310 of the decoding apparatus. The residual processor 320 of the decoding apparatus may derive the residual samples for the current block based on the residual information. Specifically, the dequantizer 321 of the residual processor 320 may derive the transform coefficients by performing the dequantization, based on the quantized transform coefficients derived based on the residual information, and the inverse transformer 322 of the residual processor may derive the residual samples for the current block by inversely transforming the transform coefficients. S540 may be performed by the adder 340 or the reconstructor of the decoding apparatus.

The decoding apparatus may derive the intra prediction mode/type for the current block based on the received prediction information (intra prediction mode/type information) (S500). The decoding apparatus may derive the neighboring reference samples of the current block (S510). The decoding apparatus generates the prediction samples in the current block based on the intra prediction mode/type and the neighboring reference samples (S520). In this case, the decoding apparatus may perform the prediction sample filtering process. The prediction sample filtering may be called the post filtering. Some or all of the prediction samples may be filtered by the prediction sample filtering process. The prediction sample filtering process may be omitted in some cases.

The decoding apparatus generates the residual samples for the current block based on the received residual information (S530). The decoding apparatus may generate the reconstructed samples for the current block based on the prediction samples and the residual samples, and derive the reconstructed block including the reconstructed samples (S540). The reconstructed picture for the current picture may be generated based on the reconstructed block. As described above, the in-loop filtering process or the like may be further applied to the reconstructed picture.

The intra prediction mode information may include, for example, flag information (e.g., intra_luma_mpm_flag) indicating whether a most probable mode (MPM) is applied to the current block or whether a remaining mode is applied thereto. At this time, if the MPM is applied to the current block, the prediction mode information may further include index information (e.g., intra_luma_mpm_idx) indicating one of intra prediction mode candidates (MPM candidates). The intra prediction mode candidates (MPM candidates) may be composed of an MPM candidate list or an MPM list. Further, if the MPM is not applied to the current block, the intra prediction mode information may further include remaining mode information (e.g., intra_luma_mpm_remainder) indicating one of remaining intra prediction modes other than the intra prediction mode candidates (MPM candidates). The decoding apparatus may determine the intra prediction mode of the current block based on the intra prediction mode information.

Further, the intra prediction type information may be implemented in various forms. As an example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and which reference sample line is used if the MRL is applied, ISP flag information (e.g., intra_subpartitions_mode_flag) indicating whether the ISP is applied to the current block, ISP type information (e.g., intra_subpartitions_split_flag) indicating split types of the subpartitions if the ISP is applied, flag information indicating whether the PDCP is applied, or flag information indicating whether the LIP is applied. Further, the intra prediction type information may include an MIP flag indicating whether the MIP is applied to the current block.

The aforementioned intra prediction mode information and/or intra prediction type information may be encoded/decoded by the coding method described in the present document. For example, the aforementioned intra prediction mode information and/or intra prediction type information may be encoded/decoded by an entropy coding (e.g., CABAC, CAVLC) based on a truncated (rice) binary code.

Meanwhile, in case that intra prediction is applied, an intra prediction mode being applied to the current block may be determined using an intra prediction mode of a neighboring block. For example, the decoding apparatus may select one of mpm candidates in a most probable mode (mpm) list derived based on the intra prediction mode of the neighboring block (e.g., left and/or top neighboring block) of the current block and additional candidate modes based on a received mpm index, or may select one of the remaining intra prediction modes that are not included in the mpm candidates (and planar mode) based on the remaining intra prediction mode information. The mpm list may be constructed to include or not to include the planar mode as the candidate. For example, if the mpm list includes the planar mode as the candidate, the mpm list may have 6 candidates, whereas if the mpm list does not include the planar mode as the candidate, the mpm list may have 5 candidates. If the mpm list does not include the planar mode as the candidate, a not planar flag (e.g., intra_luma_not_planar_flag) indicating whether the intra prediction mode of the current block is not the planar mode may be signaled. For example, the mpm flag may be first signaled, and the mpm index and the not planar flag may be signaled when the value of the mpm flag is 1. Further, the mpm index may be signaled when the value of the not planar flag is 1. Here, constructing of the mpm list not to include the planar mode as the candidate is to first identify whether the intra prediction mode is the planar mode by first signaling the flag (not planar flag) since the planar mode is always considered as the mpm rather than that the planar mode is not the mpm.

For example, whether the intra prediction mode being applied to the current block is in the mpm candidates (and planar mode) or in the remaining modes may be indicated based on the mpm flag (e.g., intra_luma_mpm_flag). The mpm flag value of 1 may represent that the intra prediction mode for the current block is in the mpm candidates (and planar mode), and the mpm flag value of 0 may represent that the intra prediction mode for the current block is not in the mpm candidates (and planar mode). The not planar flag (e.g., intra_luma_not_planar_flag) value of 0 may represent that the intra prediction mode for the current block is the planar mode, and the not planar flag value of 1 may represent that the intra prediction mode for the current block is not the planar mode. The mpm index may be signaled in the form of mpm_idx or intra_luma_mpm_idx syntax elements, and the remaining intra prediction mode information may be signaled in the form of rem_intra_luma_pred_mode or intra_luma_mpm_remainder syntax elements. For example, the remaining intra prediction mode information may index the remaining intra prediction modes that are not included in the mpm candidates (and planar mode) among the entire intra prediction modes in the order of their prediction mode numbers, and may indicate one of them. The intra prediction mode may be the intra prediction mode for the luma component (sample). Hereinafter, the intra prediction mode information may include at least one of an mpm flag (e.g., intra_luma_mpm_flag), not planar flag (e.g., intra_luma_not_planar_flag), mpm index (e.g., mpm_idx or intra_luma_mpm_idx), and remaining intra prediction mode information (rem_intra_luma_pred_mode or intra_luma_mpm_remainder). In this document, the mpm list may be called various terms, such as an mpm candidate list, a candidate mode list (candModelList), and a candidate intra prediction mode list.

In general, when a block for an image is split, a current block to be coded and a neighboring block have similar image properties. Therefore, the current block and the neighboring block are highly likely to have the same or similar intra prediction modes. Therefore, the encoder may use the intra prediction mode of the neighboring block to encode the intra prediction mode of the current block. For example, the encoder/decoder may constitute a most probable modes (MPM) list for the current block. The MPM list may also be referred to as an MPM candidate list. Here, the MPM may mean a mode used for improving the coding efficiency in consideration of the similarity between the current block and the neighboring block upon coding the intra prediction mode.

Figure 6:
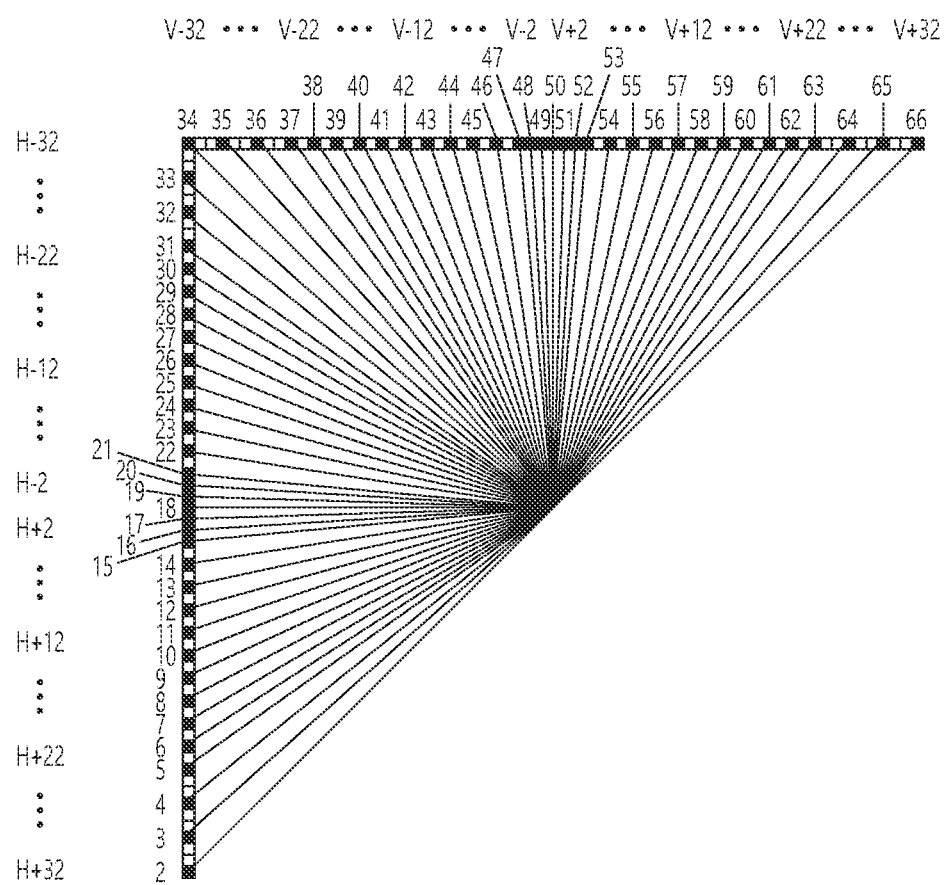
FIG. 6 illustrates an example of intra prediction modes to which embodiments of the present document are applicable.

FIG. 6 illustrates an example of intra prediction modes to which embodiments of the present document are applicable.

Referring to FIG. 6, modes may be divided into intra prediction modes having horizontal directionality and intra prediction modes having vertical directionality around a No. 34 intra prediction mode having a top-left diagonal prediction direction. In FIG. 6, H and V mean horizontal directionality and vertical directionality, respectively. Each of numbers −32 to 32 indicates displacement of a 1/32 unit on a sample grid position. The Nos. 2 to 33 intra prediction modes have the horizontal directionality, and the Nos. 34 to 66 intra prediction modes have the vertical directionality. The No. 18 intra prediction mode and the No. 50 intra prediction mode indicate a horizontal intra prediction mode and a vertical intra prediction mode, respectively. The No. 2 intra prediction mode may be called a bottom-left diagonal intra prediction mode, the No. 34 intra prediction mode may be called a top-left diagonal intra prediction mode, and the No. 66 intra prediction mode may be called a top-right diagonal intra prediction mode.

Meanwhile, the intra prediction mode used in the above-described MIP is not the existing directional mode, but may indicate a matrix and an offset used for intra prediction. That is, the matrix and the offset for the intra prediction may be derived through an intra mode for the MIP. In this case, in case of deriving the intra mode for generating the above-described typical intra prediction or MPM list, the intra prediction mode of the block predicted by the MIP may be configured as a preconfigured mode, for example, a planar mode or a DC mode. Further, according to another example, the intra mode for the MIP may be mapped on the planar mode, DC mode, or directional intra mode based on the block size.

Hereinafter, as one method for intra prediction, a matrix-based intra prediction (hereinafter, MIP) will be described.

As described above, the matrix-based intra prediction may be referred to as an affine linear weighted intra prediction (ALWIP) or a matrix weighted intra prediction (MWIP).

In order to predict samples of a rectangular block having a width W and a height H, the MIP uses one H line among reconstructed neighboring left boundary samples of the block and one W line among the reconstructed neighboring top boundary samples of the block as input values. If the reconstructed sample is not available, reference samples may be generated in an interpolation method having been applied in the typical intra prediction.

Figure 7:
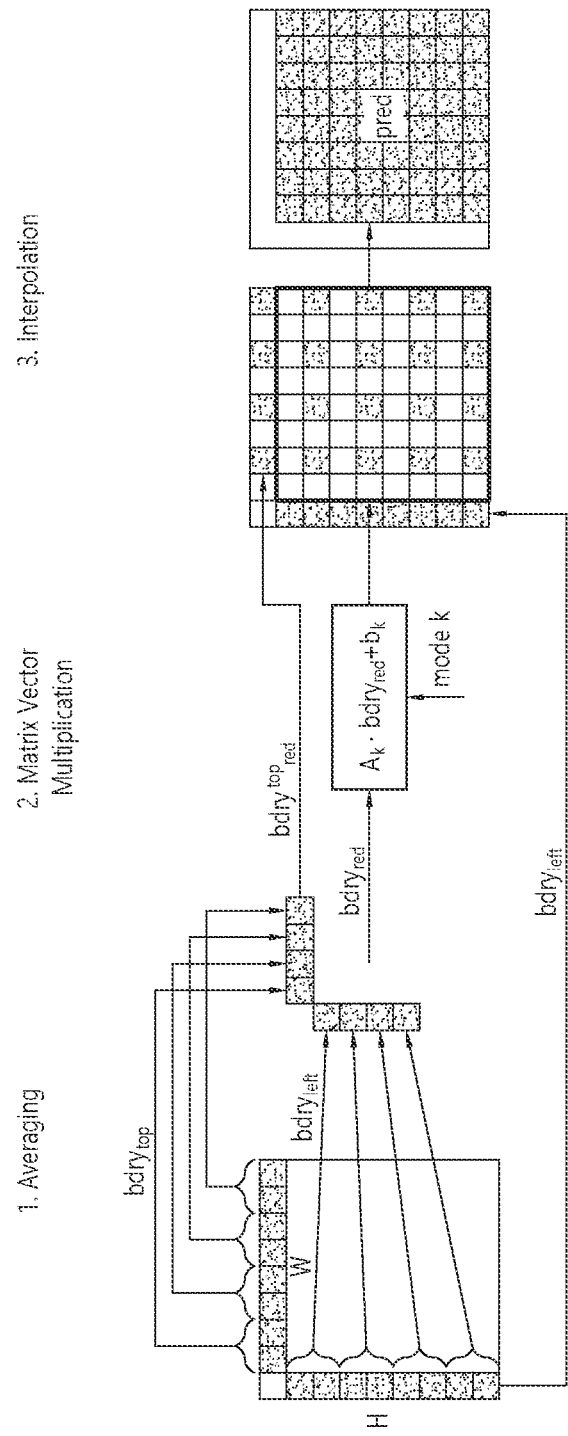
FIG. 7 is a diagram explaining a process of generating MIP-based prediction samples according to an embodiment.

FIG. 7 is a diagram explaining a process of generating MIP-based prediction samples according to an embodiment. Referring to FIG. 7, the MIP process will be described as follows.

1. Averaging Process

Through an averaging process, four of the boundary samples may be extracted in case of W=H=4, and eight of the boundary samples may be extracted in other cases.

2. Matrix Vector Multiplication Process

Matrix vector multiplication is performed with an input of averaged samples, and offsets are subsequently added. Through such an operation, reduced prediction samples for the sub-sampled sample set in the original block may be derived.

3. (Linear) Interpolation Process

The prediction samples in the remaining positions are generated from the prediction samples of the sub-sampled sample set by linear interpolation that is a single-step linear interpolation in respective directions.

Matrixes and offset vectors that are necessary to generate prediction blocks or prediction samples may be selected from three sets $S_0$, $S_1$, and $S_2$ for the matrixes.

The set $S_0$ may be composed of 18 matrixes $A_0^i$, $i \in \{0, \ldots, 17\}$ and 18 offset vectors $b_0^i$, $i \in \{0, \ldots, 17\}$. For example, each of the matrixes $A_0^i$, $i \in \{0, \ldots, 17\}$ may have 16 rows and 4 columns. In an example, each of the offset vectors $b_0^i$, $i \in \{0, \ldots, 17\}$ may have a size of 16. Matrixes and offset vectors of the set $S_0$ may be used for blocks having a size of 4×4.

The set $S_1$ may be composed of 10 matrixes $A_1^i$, $i \in \{0, \ldots, 9\}$ and 10 offset vectors $b_1^i$, $i \in \{0, \ldots, 9\}$. For example, each of the matrixes $A_1^i$, $i \in \{0, \ldots, 9\}$ may have 16 rows and 8 columns. In an example, each of the offset vectors $b_1^i$, $i \in \{0, \ldots, 9\}$ may have a size of 16. Matrixes and offset vectors of the set $S_1$ may be used for blocks having sizes of 4×8, 8×4, and 8×8.

Last, the set $S_2$ may be composed of 6 matrixes $A_2^i$, $i \in \{0, \ldots, 5\}$ and 6 offset vectors $b_2^i$, $i \in \{0, \ldots, 5\}$. For example, each of the matrixes $A_2^i$, $i \in \{0, \ldots, 5\}$ may have 64 rows and 8 columns. In an example, each of the offset vectors $b_2^i$, $i \in \{0, \ldots, 5\}$ may have a size of 64. The matrixes and offset vectors of the set $S_2$ or some of them may be used for block types of all other sizes to which the set $S_0$ and the set $S_1$ are not applied.

The total number of multiplications required to calculate a matrix vector product may be always equal to or smaller than 4×W×H. For example, up to four times multiplications per sample may be required in an MIP mode.

In relation to an embodiment for averaging of neighboring samples, out of the boundary samples, four samples may be extracted through averaging in case of W=H=4, and 8 samples may be extracted through averaging. For example, input boundaries $bdry^{left}$ and $bdry^{top}$ may be reduced to smaller boundaries $bdry_{red}^{top}$ and $bdry_{red}^{left}$ through averaging of the neighboring boundary samples in accordance with a predefined rule dependent to the block size.

Since the two reduced boundaries $bdry_{red}^{top}$ and $bdry_{red}^{left}$ are concatenated to the reduced boundary vector $bdry_{red}$, the size of the bdry$_{red}$ is 4 in case of 4×4 type block, and the size thereof is 8 in case of all other blocks.

In case that "mode" is referred to as the MIP mode, the range of the reduced boundary vector bdry$_{red}$ and the MIP mode value (mode) may be defined as in the following equation.

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases}$$ [Equation 1]

In relation to the embodiment of the matrix vector multiplication, the matrix vector multiplication may be executed with averaged samples as an input. One of the reduced input vectors bdry$_{red}$ generates a reduced prediction signal pred$_{red}$. The prediction sample is a signal for a down-sampled block having a width $W_{red}$ and a height $H_{red}$. For example, $W_{red}$ and $H_{red}$ may be defined as in the following equation.

$$W_{red} = \begin{cases} 4 & \text{for } \max(W, H) \leq 8 \\ \min(W, 8) & \text{for } \max(W, H) > 8 \end{cases}$$ [Equation 2]

$$H_{red} = \begin{cases} 4 & \text{for } \max(W, H) \leq 8 \\ \min(H, 8) & \text{for } \max(W, H) > 8 \end{cases}$$

The reduced prediction sample pred$_{red}$ may be calculated by adding an offset after performing the matrix vector multiplication, and may be derived through the following equation.

$$pred_{red} = A \cdot bdry_{red} + b$$ [Equation]

Here, A denotes a matrix having $W_{red} \times h_{red}$ rows and four columns in case that W and H are 4 (W=H=4), or 8 columns in all other cases, and b denotes a vector having a size of $W_{red} \times h_{red}$.

The matrix A and the offset vector b may be selected among the sets $S_0$, $S_1$, and $S_2$. For example, the index idx=idx(W,H) may be defined as in the following equation.

$$idx(W, H) = \begin{cases} 0 & \text{for } W = H = 4 \\ 1 & \text{for } \max(W, H) = 8 \\ 2 & \text{for } \max(W, H) > 8. \end{cases}$$ [Equation 4]

If the idx is equal to or smaller than 1 (idx≤1) or the idx is 2, and a smaller value between W and H is larger than 4 (min(W, H)>4), A is set to $A_{idx}^m$ (A=$A_{idx}^m$), and b is set to $b_{idx}^m$ (b=$b_{idx}^m$). If the idx is 2, a smaller value between W and H is 4 (min(W, H)=4), and W is 4, A becomes a matrix from which respective rows of $A_{idx}^m$ corresponding to an odd x coordinate in the down-sampled block are removed. Further, if H is 4, A becomes a matrix from which respective columns of $A_{idx}^m$ corresponding to an odd y coordinate in the down-sampled block.

Since A is composed of 4 columns and 16 rows in case of W=H=4, the number of multiplications necessary for calculation of pred$_{red}$ is 4. In all other cases, since A is composed of 8 columns and $W_{red} \times h_{red}$ rows, it may be confirmed that up to four multiplications per sample are necessary to calculate the pred$_{red}$.

An interpolation process may be referred to as a linear interpolation or bilinear linear interpolation process. As illustrated, the interpolation process may include two steps of 1) vertical interpolation and 2) horizontal interpolation.

In case of W>=H, the vertical linear interpolation may be first applied, and then the horizontal interpolation may be applied. In case of W<H, the horizontal linear interpolation may be first applied, and then the vertical linear interpolation may be applied. In case of the 4×4 block, the interpolation process may be omitted.

In case of a W×H block with max(W, H)≥8, the prediction sample is derived from the reduced prediction sample pred$_{red}$ on $W_{red} \times H_{red}$. In accordance with the block type, the linear interpolation is performed in vertical, horizontal, or both directions. In case that the linear interpolation is applied in both directions, the linear interpolation is first applied in the horizontal direction in case of W<H, and the linear interpolation is first applied in the vertical direction otherwise.

In case of the W×H block in which max(W, H)≥8 and W>=H, it may be considered that there is not a generality loss. In this case, one-dimensional linear interpolation is performed as follows. If there is not the generality loss, the linear interpolation in the vertical direction is explained adequately.

First, a reduced prediction sample is extended to the top by a boundary signal. A vertical up-sampling coefficient $U_{ver} = H/H_{red}$ may be defined, and if it is configured that $U_{ver} = 2^{u_{ver}} > 1$, the extended reduced prediction sample may be configured as in the following equation.

For each coding unit (CU) in an intra mode, a flag indicating whether the MIP mode is applied to the corresponding current block. If the MIP mode is applied, an MPM flag may be signaled, and whether the prediction mode is one of MPM modes may be indicated. For example, three modes may be considered for the MPM. In an example, the MPM modes may be context-coded through truncated binarization. The non-MPM mode may be coded as a fixed length code (FLC). Derivation of such MPMs may be combined with a normal intra prediction mode by performing mode mapping between a normal intra prediction mode and an MIP intra prediction mode based on predefined mapping tables dependent to the block size (i.e., idx(W,H) ∈ {0, 1, 2}). The following equations may represent a forward (from the normal mode to the MIP mode) and/or inverse (from the MIP mode to the normal mode) mode mapping tables.

$$predmode_{ALWIP} = map\_angular\_to\_alwip_{idx}[predmode_{Angular}]$$ [Equation 5]

$$predmode_{Angular} = map\_alwip\_to\_angular_{idx(PU)}[predmode_{ALWIP}]$$ [Equation 6]

In an example, 35 modes may be available for blocks (e.g., max(W,H)<=8 && W*H<32). In another example, 19 modes may be used for blocks (e.g., max(W,H)=8). 11 modes may be used for blocks (e.g., max(W,H)>8). In addition, in order to reduce memory consumption, two modes may share the same matrix and/or offset vector as in the following equation.

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6. \end{cases}$$ [Equation 7]

Hereinafter, a method for maximizing the performance while reducing complexity for an MIP technique will be described. Embodiments to be described later may be independently performed, or may be performed in combination.

According to an embodiment of the present document, whether to apply the MIP may be adaptively selected (determined) in accordance with the type of the current (luma) block in the MIP process. In the existing embodiment, if the difference between the width and the height of the luma block exceeds four times (e.g., 32×4, 64×8, 64×4, 4×32, 8×64, 4×64, 128×4, 128×8, 128×16, 4×128, 8×128, and 16×128), the MIP is not performed, and/or a flag representing whether to apply the MIP is not transmitted. In the present embodiment, a method for enhancing encoding and decoding efficiencies in case that the MIP is applied by extending or removing this.

In one of examples of the present embodiment, in case that the width of the current (luma) block is 4, and the height thereof is equal to or larger than 16, the MIP may not be applied, or in case that the height of the current (luma) block is 4, and the width thereof is equal to or larger than 16, the MIP may not be applied. Some of coding unit syntaxes according to the present example may be the same as the following table.

TABLE 1

```
if( sps_mip_enabled_flag &&
   ((cbWidth == 4 && cbHeight < 16) || (cbWidth < 16 && cbHeight == 4)) &&
      cbWidth <= MaxTbSizeY && cbHeight <= MaxTbSizeY )
   intra_mip_flag[ x0 ][ y0 ]
if( intra_mip_flag[ x0 ][ y0 ] )
   intra_mip_mode[ x0 ][ y0 ]
else {
   ...
```

In the above-described example, the MIP is not applied with respect to 4×16 and 16×4 blocks having low MIP efficiency, and thus the MIP efficiency can be improved.

In another example among examples of the present embodiment, in case that the width of the current (luma) block is 4 and the height thereof is equal to or larger than 32, the MIP may not be applied, and in case that the height of the current (luma) block is 4 and the width thereof is equal to or larger than 32, the MIP may not be applied. Some of coding unit syntaxes according to the present example may be as in the following table.

TABLE 2

```
if( sps_mip_enabled_flag &&
   ((cbWidth == 4 && cbHeight < 32) || (cbWidth < 32 && cbHeight == 4)) &&
      cbWidth <= MaxTbSizeY && cbHeight <= MaxTbSizeY )
   intra_mip_flag[ x0 ][ y0 ]
if( intra_mip_flag[ x0 ][ y0 ] )
      intra_mip_mode[ x0 ][ y0 ]
else {
   ...
```

Through the above-described examples, the MIP can be applied with respect to 8×64 and 64×8 blocks to which the MIP can be applied efficiently and easily, and thus the MIP efficiency can be enhanced.

According to still another example of the present embodiment, the block type limit for the MIP can be removed. For example, in the present example, the MIP can always be applied with respect to all blocks (being subject to the coding). In case that the MIP flag is signaled (parsed), the condition determination for the width and/or the height of the current (luma) block can be removed. Accordingly, the MIP parsing condition can be simplified, and further, complexity in software and hardware implementations can be reduced. Some of coding unit syntaxes according to the present example may be as in the following table.

TABLE 3 if(sps_mip_enabled_flag && cbWidth <= MaxTbSizeY && cbHeight <= MaxTbSizeY )
  intra_mip_flag[ x0 ][ y0 ]
if( intra_mip_flag[ x0 ][ y0 ] )
  intra_mip_mode[ x0 ][ y0 ]
else {
  ...

The test result through application of the present example may be as in the following table.

TABLE 4

| | Over VTM-6.0 | | | | |
|---|---|---|---|---|---|
| | Y | U | V | EncT | DecT |
| All Intra Main10 | | | | | |
| Class A1 | −0.03% | 0.00% | 0.04% | 102% | 100% |
| Class A2 | 0.00% | 0.06% | −0.04% | 102% | 101% |
| Class B | 0.00% | 0.00% | −0.03% | 102% | 100% |
| Class C | 0.00% | −0.09% | −0.01% | 101% | 101% |
| Class E | −0.01% | −0.02% | 0.03% | 101% | 99% |
| Overall | −0.01% | −0.01% | 0.00% | 101% | 100% |
| Class D | 0.01% | −0.05% | −0.11% | 104% | 100% |
| Class F | −0.01% | 0.00% | −0.05% | 101% | 101% |
| Class SCC | −0.01% | −0.01% | 0.00% | 100% | 99% |
| Random access Main10 | | | | | |
| Class A1 | −0.02% | −0.07% | −0.01% | 101% | 99% |
| Class A2 | −0.01% | 0.09% | 0.08% | 100% | 99% |
| Class B | −0.02% | 0.07% | 0.04% | 101% | 101% |
| Class C | −0.01% | −0.07% | −0.17% | 102% | 101% |
| Class E | | | | | |
| Overall | −0.01% | 0.01% | −0.02% | 101% | 100% |
| Class D | −0.03% | −0.30% | −0.14% | 101% | 102% |
| Class F | 0.01% | −0.01% | 0.05% | 100% | 99% |
| Class SCC | −0.01% | −0.01% | −0.01% | 99% | 99% |

Referring to the above table, the results of allintra (AI) and randomaccess (RA) are presented in the above test. As shown in the above table, it is confirmed that there is not performance degradation in the present embodiment. That is, in case of the proposed method 3, since signaling (parsing) burden can be simplified through MIP flag signaling (parsing) condition relief, there is an advantage on hardware implementation, and encoding and decoding performance degradation does not occur.

According to the present embodiment, in S400 and/or S410 of FIG. 4, whether to apply the MIP for the current block can be determined, and in this case, whether to apply the MIP can be adaptively determined in accordance with the type of the current (luma) block as described above. In this case, in S420, the encoding apparatus can adaptively code intra_mip_flag.

In an embodiment of the present document, the number of MIP modes can be adaptively determined (selected) in accordance with the type of the current (luma) block in the MIP process. In the existing embodiment, 35 MIP modes may be used for the 4×4 luma block (MipSizeId 0), and 19 MIP modes may be used for the 4×4, 8×4, or 8×8 luma block (MipSizeId 1), and 11 MIP modes may be used for the other luma block (MipSizeId 2).

In the present embodiment, a smaller number of MIP modes can be used for the block type having a low MIP efficiency. Through the present embodiment, the amount of transmission data of information on the MIP modes can be reduced.

Figure 8:
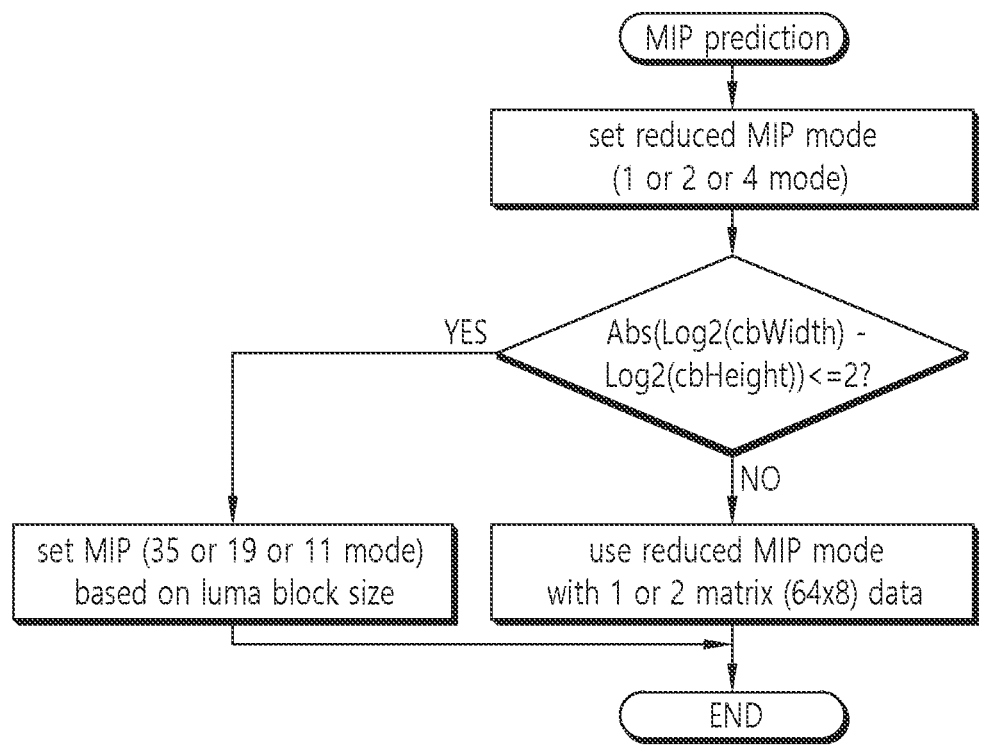
FIGS. 8, 9, and 10 are flowcharts illustrating an MIP process according to embodiments of the present document.
Figure 9:
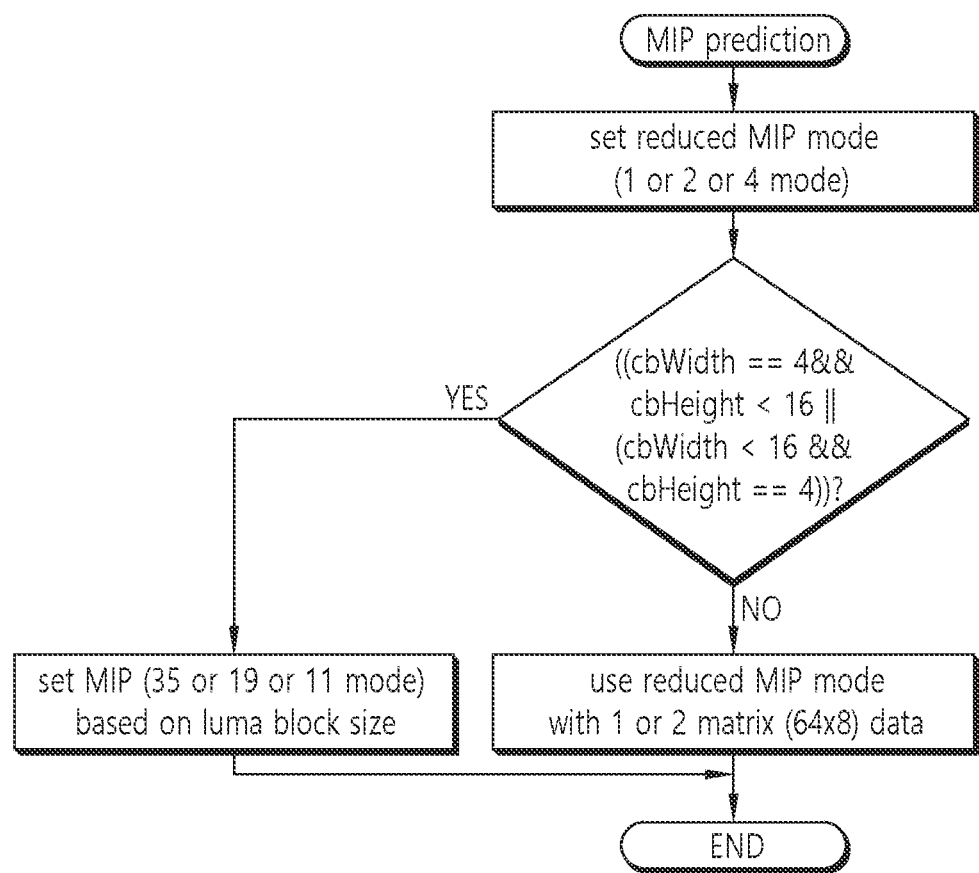
Figure 10:
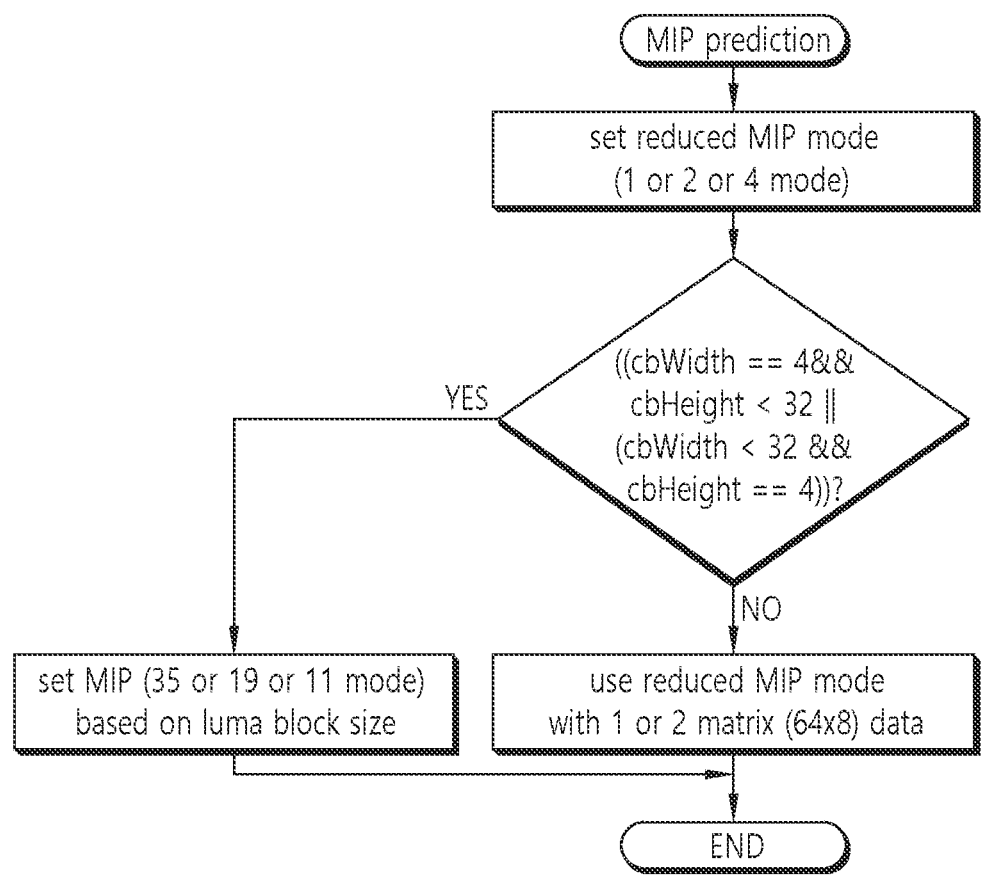

FIGS. 8, 9, and 10 are flowcharts illustrating an MIP process according to embodiments of the present document.

Referring to FIG. 8, in an embodiment related to FIG. 8, if a difference between a width and a height of a current (luma) block exceeds four times the width or the height of the current (luma) block (if the height of the current block is four times larger than the width of the current block, or if the width of the current block is four times larger than the height of the current block), MIP modes the number of which is smaller than 11 basic modes (MipSizeId 2) may be used, and information related to the MIP modes may be transmitted.

Referring to FIG. 9, in an embodiment related to FIG. 9, if the width of the current (luma) block is 4, and the height thereof is equal to or larger than 16, MIP modes the number of which is smaller than 11 basic modes (MipSizeId 2) may be used, and information related to the MIP modes may be transmitted. Further, if the height of the current (luma) block is 4, and the width thereof is equal to or larger than 16, MIP modes the number of which is smaller than 11 basic modes (MipSizeId 2) may be used, and information related to the MIP modes may be transmitted.

Referring to FIG. 10, in an embodiment related to FIG. 10, if the width of the current (luma) block is 4, and the height thereof is equal to or larger than 32, MIP modes the number of which is smaller than 11 basic modes (MipSizeId 2) may be used, and information related to the MIP modes may be transmitted. Further, if the height of the current (luma) block is 4, and the width thereof is equal to or larger than 32, MIP modes the number of which is smaller than 11 basic modes (MipSizeId 2) may be used, and information related to the MIP modes may be transmitted.

Through the embodiments according to FIGS. 8 to 10, by using a small number of MIP modes with respect to a block having a less MIP prediction efficiency (block type having a large difference between the width and the height), the amount of transmission data for the MIP modes can be reduced, and through this, the MIP prediction efficiency can be enhanced.

In addition, in the embodiments explained with reference to FIGS. 8 to 10, only some of 11 MIP modes may be used, and this is to increase the MIP efficiency through data reduction. In an example, only one of the 11 MIP modes may be used, and in this case, MIP mode data may not be transmitted. In another example, only two of the 11 MIP modes may be used, and in this case, one-bit MIP mode data may be transmitted. In still another example, only four of the 11 MIP modes may be used, and in this case, 2-bit MIP mode data may be transmitted. One, two, or four of the 11 modes may be selected in the order of MIP kernels in the existing embodiment, or may be selected in the order of MIP selection mode probabilities in a block form as in the method explained above according to FIGS. 8 to 10.

Figure 11:
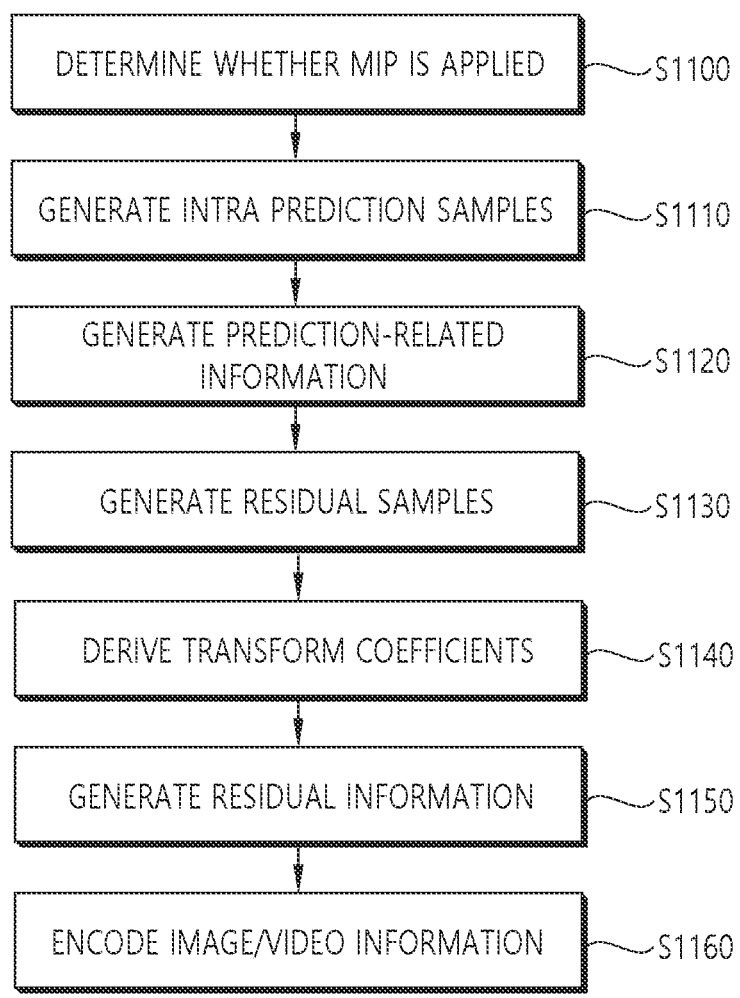
FIGS. 11 and 12 schematically illustrate a video/image encoding method and an example of related components according to embodiment(s) of the present document.
Figure 12:
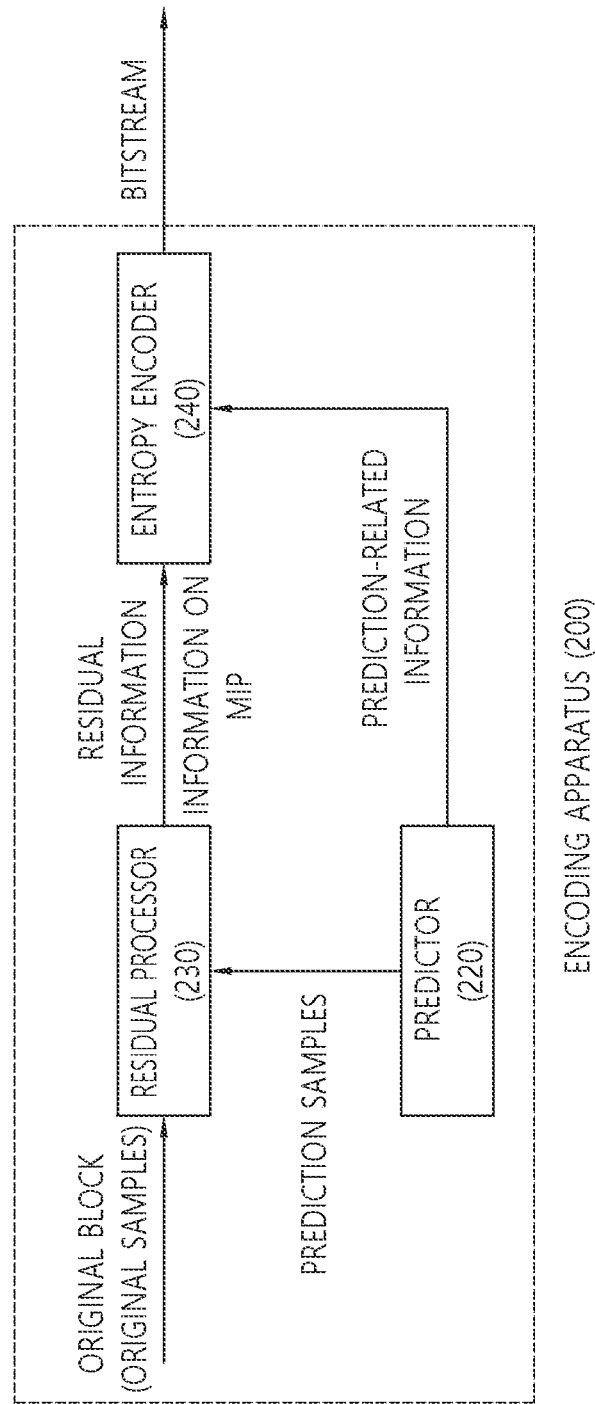

FIGS. 11 and 12 schematically illustrate a video/image encoding method and an example of related components according to embodiment(s) of the present document.

The method disclosed in FIG. 11 may be performed by the encoding apparatus disclosed in FIG. 2 or FIG. 12. Specifically, for example, S1100 and S1110 of FIG. 11 may be performed by the predictor 220 of the encoding apparatus of FIG. 12, S1120 to S1140 of FIG. 11 may be performed by the residual processor 230 of the encoding apparatus of FIG. 12, and S1150 of FIG. 11 may be performed by the entropy encoder 240 of the encoding apparatus of FIG. 12. The method disclosed in FIG. 11 may include the embodiments described above in the present document.

Referring to FIG. 11, the encoding apparatus may determine whether matrix-based intra prediction (MIP) is applied to the current block (S1100). If the MIP is applied to the current block, the encoding apparatus may generate intra MIP flag information indicating that the MIP is applied to the current block. If the MIP is not applied to the current block, the encoding apparatus may generate intra MIP flag information (e.g., intra_mip_flag) indicating that the MIP is not applied to the current block. The encoding apparatus may output image information including the intra MIP flag information as the bitstream.

The encoding apparatus may generate prediction samples for the current block (S1110). The encoding apparatus may generate the prediction samples based on the determination that the MIP is applied to the current block.

The encoding apparatus may generate prediction-related information (S1120). The encoding apparatus may generate the prediction-related information based on the determination that the MIP is applied to the current block. For example, the prediction-related information may include intra MIP flag information (e.g., intra_mip_flag). In addition, the prediction-related information may further include intra MIP mode information (e.g., intra_mip_mode).

The encoding apparatus may generate residual samples for the current block (S1130). The encoding apparatus may generate the residual samples based on the intra prediction samples. The encoding apparatus may generate the residual samples based on the difference between the original samples for the current block and the intra prediction samples.

The encoding apparatus may derive (quantized) transform coefficients (S1140). The encoding apparatus may derive the transform coefficients based on a transform process for the residual samples. For example, the transform process may include at least one of DCT, DST, GBT, or CNT. The encoding apparatus may derive quantized transform coefficients. The encoding apparatus may derive the quantized transform coefficients based on a quantization process for the transform coefficients. The quantized transform coefficients may have a one-dimensional vector form based on a coefficient scan order.

The encoding apparatus may generate residual information (S1150). The encoding apparatus may generate the residual information representing the quantized transform coefficients. The residual information may be generated through various encoding methods, such as exponential Golomb, CAVLC, and CABAC.

The encoding apparatus may encode image information including the prediction-related information and the residual information (S1160). The prediction-related information may include information on MIP. The information on the MIP may include intra MIP flag information related to whether the MIP is applied to the current block. The intra MIP flag information may be related to whether the intra prediction mode type for the current block is the MIP. Further, the information on the MIP may include intra MIP mode information related to the MIP being applied to the current block.

The encoded video/image information may be output in the form of a bitstream. The bitstream may be transmitted to the decoding apparatus through a network or a storage medium.

The image/video information may include various kinds of information according an embodiment of the present document. For example, the image/video information may include information disclosed in at least one of Tables 1 to 3 as described above.

In an embodiment, an MIP matrix (MIP weight matrix) for the MIP may be derived based on the width and/or the height of the current block.

In an embodiment, MIP samples for the current block may be generated based on the MIP matrix.

In an embodiment, the prediction samples for the current block may be generated based on the MIP samples.

In an embodiment, the image information may include MIP mode information. The MIP matrix may be derived further based on the MIP mode information.

In an embodiment, a syntax element bin string for the MIP mode information may be binarized by a truncated binarization method.

In an embodiment, the image information may include a sequence parameter set (SPS). The SPS may include MIP available flag information (e.g., sps_mip_enabled_flag) related to whether the MIP is available.

In an embodiment, reduced boundary samples may be derived by down-sampling reference samples (boundary samples) adjacent to the current block. The MIP samples may be generated based on a product between the reduced boundary samples and the matrix.

In an embodiment, the encoding apparatus may perform up-sampling of the MIP samples. The prediction samples may be generated based on the up-sampled MIP samples. That is, the prediction samples may be generated based on the up-sampled MIP samples.

In an embodiment, the height of the current block may be four times larger than the width of the current block.

In an embodiment, the width of the current block may be four times larger than the height of the current block.

In an embodiment, the size of the current block is 32×4, 4×32, 64×8, 8×64, 64×4, 4×64, 128×4, 128×8, 128×16, 4×128, 8×128, or 16×128.

In an embodiment, the MIP matrix may be derived based on three matrix sets being classified in accordance with the size of the current block, and/or each of the three matrix sets may include a plurality of matrixes.

Figure 13:
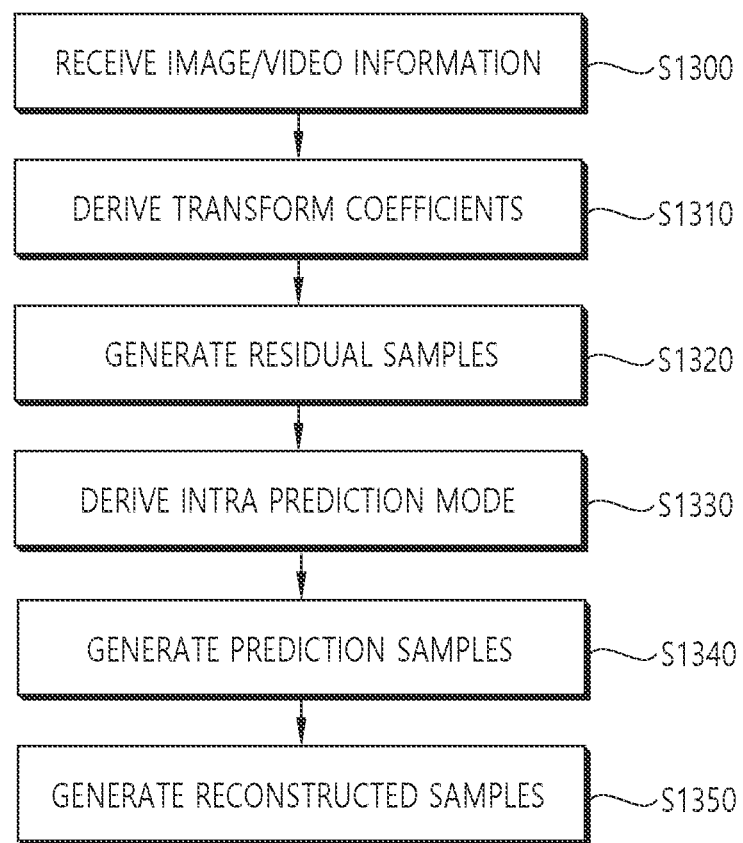
FIGS. 13 and 14 schematically illustrate a video/image decoding method and an example of related components according to an embodiment of the present document.
Figure 14:
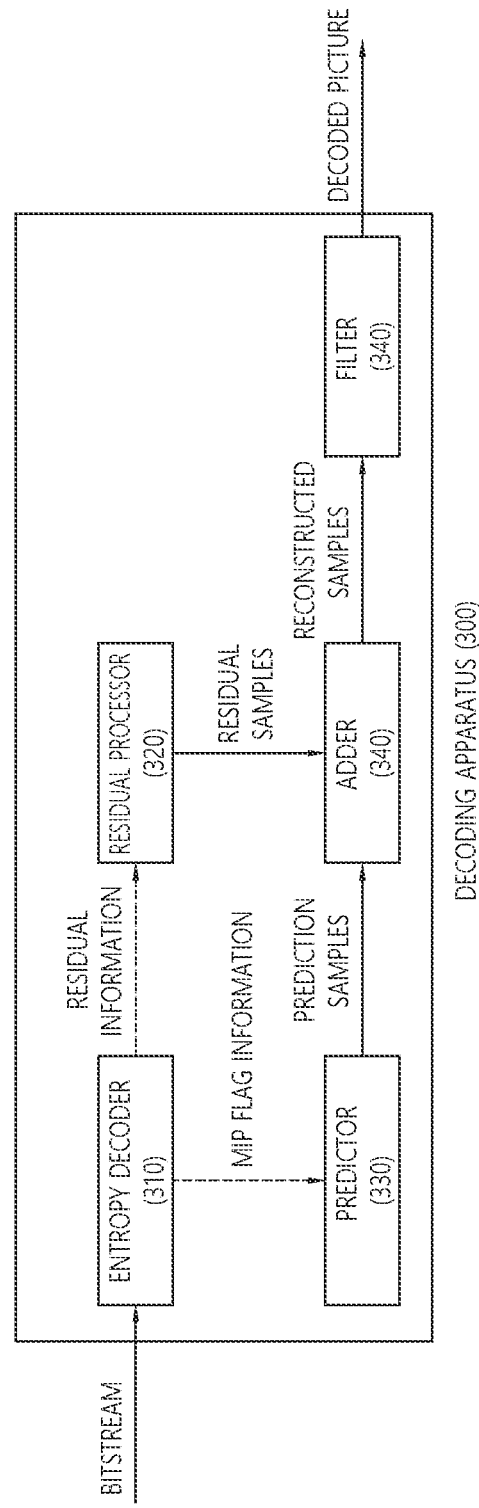

FIGS. 13 and 14 schematically illustrate a video/image decoding method and an example of related components according to embodiment(s) of the present document.

The method disclosed in FIG. 13 may be performed by the decoding apparatus disclosed in FIG. 3 or FIG. 14. Specifically, for example, S1300 of FIG. 13 may be performed by the entropy decoder 310 of the decoding apparatus of FIGS.

13, S1310 and S1320 of FIG. 13 may be performed by the residual processor 320 of the decoding apparatus, S1330 and S1340 of FIG. 13 may be performed by the predictor 330 of the decoding apparatus of FIG. 14, and S1350 of FIG. 13 may be performed by the adder 340 of the decoding apparatus of FIG. 14. The method disclosed in FIG. 13 may include the embodiments described above in the present document.

Referring to FIG. 13, the decoding apparatus may obtain (receive) image information including residual information and prediction-related information through the bitstream (S1300). The predicted-related information may include information on MIP. For example, the decoding apparatus may obtain the intra MIP flag information by parsing or decoding the bitstream. Here, the bitstream may be called encoded (image) information.

The image/video information may include various kinds of information according to an embodiment of the present document. For example, the image/video information may include information disclosed in at least one of Table 1 to Table 3 as described above.

The decoding apparatus may derive transform coefficients (S1310). Specifically, the decoding apparatus may derive quantized transform coefficients based on residual information. The quantized transform coefficients may have a one-dimensional vector form based on a coefficient scan order. The decoding apparatus may derive the transform coefficients based on a dequantization process for the quantized transform coefficients.

The decoding apparatus may generate residual samples (S1320). The decoding apparatus may derive the residual samples based on the transform coefficients. The decoding apparatus may generate the residual samples based on an inverse transform process for the transform coefficients.

The decoding apparatus may derive an intra prediction mode for the current block (S1330). The decoding apparatus may derive the intra prediction mode based on prediction mode information among prediction-related information included in the image information.

The decoding apparatus may generate prediction samples for the current block (S1340). The decoding apparatus may generate the intra prediction samples based on the intra prediction mode. The decoding apparatus may generate the prediction samples based on neighboring reference samples in the current picture including the current block.

The decoding apparatus may generate reconstructed samples for the current block (S1350). The reconstructed samples may be generated based on the prediction samples and the residual samples. The decoding apparatus may directly use the prediction samples as the reconstructed sample in accordance with the prediction mode, or may generate the reconstructed samples by adding the residual samples to the prediction samples.

In an embodiment, an MIP matrix for the MIP (MIP weight matrix) may be derived based on the width and/or the height of the current block.

In an embodiment, MIP samples for the current block may be generated based on the MIP matrix.

In an embodiment, the prediction samples for the current block may be generated based on the MIP samples.

In an embodiment, the image information may include MIP mode information. The MIP matrix may be derived further based on the MIP mode information.

In an embodiment, a syntax element bin string for the MIP mode information may be binarized by a truncated binarization method.

In an embodiment, the image information may include a sequence parameter set (SPS). The SPS may include MIP available flag information (e.g., sps_mip_enabled_flag) related to whether the MIP is available.

In an embodiment, reduced boundary samples may be derived by down-sampling reference samples (boundary samples) adjacent to the current block. The MIP samples may be generated based on a product between the reduced boundary samples and the matrix.

In an embodiment, the decoding apparatus may perform up-sampling of the MIP samples. The prediction samples may be generated based on the up-sampled MIP samples. That is, the prediction samples may be generated based on the up-sampled MIP samples.

In an embodiment, the height of the current block may be four times larger than the width of the current block.

In an embodiment, the width of the current block may be four times larger than the height of the current block.

In an embodiment, the size of the current block is 32×4, 4×32, 64×8, 8×64, 64×4, 4×64, 128×4, 128×8, 128×16, 4×128, 8×128, or 16×128.

In an embodiment, the MIP matrix may be derived based on three matrix sets being classified in accordance with the size of the current block, and/or each of the three matrix sets may include a plurality of matrixes.

In case that the residual samples for the current block are present, the decoding apparatus may receive information on the residual for the current block. The information on the residual may include transform coefficients for the residual samples. The decoding apparatus may derive the residual samples (or residual sample array) for the current block based on the residual information. Specifically, the decoding apparatus may derive quantized transform coefficients based on the residual information. The quantized transform coefficients may have a one-dimensional vector form based on a coefficient scan order. The decoding apparatus may derive the transform coefficients based on a dequantization process for the quantized transform coefficients. The decoding apparatus may derive residual samples based on the transform coefficients.

The decoding apparatus may generate reconstructed samples based on the (intra) prediction samples and the residual samples, and may derive a reconstructed block or a reconstructed picture based on the reconstructed samples. Specifically, the decoding apparatus may generate the reconstructed samples based on a sum between the (intra) prediction samples and the residual samples. Thereafter, as described above, the decoding apparatus, if necessary, may apply an in-loop filtering procedure, such as deblocking filtering and/or SAO process, to the reconstructed picture in order to improve the subjective/objective picture quality.

For example, the decoding apparatus may obtain the image information including all or some of the above-described pieces of information (or syntax elements) by decoding the bitstream or encoded information. Further, the bitstream or encoded information may be stored in a computer-readable storage medium, or may cause the above-described decoding method to be performed.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding device and/or decoding device according to the present document is, for example, may be included in the device that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 15:
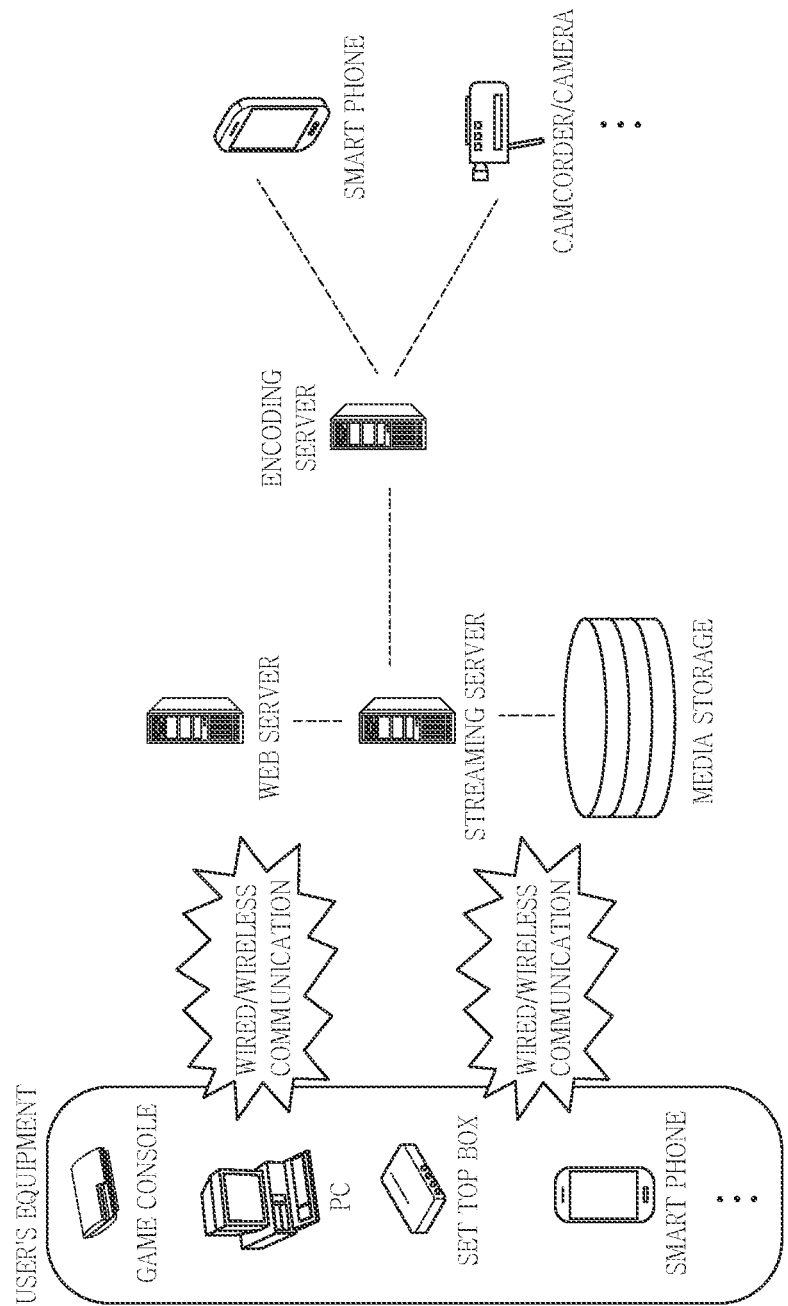
FIG. 15 illustrates an example of a content streaming system to which embodiments disclosed in the present document are applicable.

FIG. 15 shows an example of a content streaming system to which embodiments disclosed in the present document may be applied.

Referring to FIG. 15, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment (s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. A decoding apparatus for an image decoding, the decoding apparatus comprising:
a memory; and
at least one processor connected to the memory, the at least one processor configured to:
obtain image information including residual information and prediction-related information through a bitstream;
generate residual samples for a current block based on the residual information;
generate prediction samples for the current block based on the prediction-related information; and
generate reconstructed samples for the current block based on the prediction samples and the residual samples,
wherein the image information includes flag information related to whether an intra prediction mode type for the current block is a matrix-based intra prediction (MIP),
wherein for the current block of which size is equal to 64×8, the flag information related to whether the intra prediction mode type for the current block is the MIP is included in the image information,
wherein whether the intra prediction mode type for the current block is the MIP is determined based on the flag information,
wherein a value of the flag information being equal to 1 is related to representing that the intra prediction mode type for the current block is the MIP, and a value of the flag information being equal to 0 is related to representing that the intra prediction mode type for the current block is not the MIP,
wherein based on the value of the flag information being equal to 1, the image information includes MIP mode information, wherein the MIP mode information is related to an MIP mode applied to the current block and the MIP mode is used to derive an MIP matrix for the current block,
wherein the MIP matrix is derived based on (i) a width and a height of the current block for the MIP and (ii) the MIP mode information, and
wherein the prediction samples for the current block are generated based on the MIP matrix.

2. An encoding apparatus for an image encoding, the encoding apparatus comprising:
a memory; and
at least one processor connected to the memory, the at least one processor configured to:
determine whether a matrix-based intra prediction (MIP) is applied to a current block;
generate prediction samples for the current block based on the determination that the MIP is applied to the current block;
generate prediction-related information based on the determination that the MIP is applied to the current block;
generate residual samples for the current block based on the prediction samples;
generate residual information based on residual samples; and
encode image information including the prediction-related information and the residual information,
wherein the prediction-related information includes flag information related to whether an intra prediction mode type for the current block is the MIP, wherein for the current block of which size is equal to 64×8, the flag information related to whether the intra prediction mode type for the current block is the MIP is included in the image information,
wherein whether the intra prediction mode type for the current block is the MIP is determined based on the flag information,
wherein a value of the flag information being equal to 1 is related to representing that the intra prediction mode type for the current block is the MIP, and a value of the flag information being equal to 0 is related to representing that the intra prediction mode type for the current block is not the MIP,
wherein based on the value of the flag information being equal to 1, the image information includes MIP mode information, wherein the MIP mode information is related to an MIP mode applied to the current block and the MIP mode is used to derive an MIP matrix for the current block,
wherein the MIP matrix is derived based on (i) a width and a height of the current block and (ii) the MIP mode information, and
wherein the prediction samples for the current block are generated based on the MIP matrix.

3. An apparatus for transmitting data for an image, the apparatus comprising:
at least one processor configured to obtain a bitstream for the image, wherein the bitstream is generated based on determining whether a matrix-based intra prediction (MIP) is applied to a current block, generating prediction samples for the current block based on the determination that the MIP is applied to the current block, generating prediction-related information based on the determination that the MIP is applied to the current block, generating residual samples for the current block based on the prediction samples, generating residual information based on residual samples, encoding image information including the prediction-related information and the residual information; and
a transmitter configured to transmit the data comprising the bitstream,
wherein the prediction-related information includes flag information related to whether an intra prediction mode type for the current block is the MIP, wherein for the current block of which size is equal to 64×8, the flag information related to whether the intra prediction mode type for the current block is the MIP is included in the image information,
wherein whether the intra prediction mode type for the current block is the MIP is determined based on the flag information,
wherein a value of the flag information being equal to 1 is related to representing that the intra prediction mode type for the current block is the MIP, and a value of the flag information being equal to 0 is related to representing that the intra prediction mode type for the current block is not the MIP,
wherein based on the value of the flag information being equal to 1, the image information includes MIP mode information, wherein the MIP mode information is related to an MIP mode applied to the current block and the MIP mode is used to derive an MIP matrix for the current block,
wherein the MIP matrix is derived based on (i) a width and a height of the current block and (ii) the MIP mode information, and wherein the prediction samples for the current block are generated based on the MIP matrix.

* * * * *